July 8, 1930.  C. E. HOPPES  1,770,271
COUPLING DEVICE
Filed Nov. 13, 1926

INVENTOR
Charles E. Hoppes
BY
Bowman
ATTORNEYS

Patented July 8, 1930

1,770,271

UNITED STATES PATENT OFFICE

CHARLES E. HOPPES, OF SPRINGFIELD, OHIO, ASSIGNOR TO THE EVERWEAR MANUFACTURING COMPANY, OF SPRINGFIELD, OHIO, A CORPORATION OF OHIO

COUPLING DEVICE

Application filed November 13, 1926. Serial No. 148,276.

My invention relates to coupling devices, it being particularly intended for joining together the ends of adjacent members, such for instance as the tubular frame members of play-ground apparatus, although it is equally applicable to the connection of other structures.

The object of my invention is to provide simple and effective devices for connecting together the adjacent ends of co-operating members of a nature which will not only permit the connection to be quickly and easily made but which will be effective in rigidly securing the members together.

Figure 1:
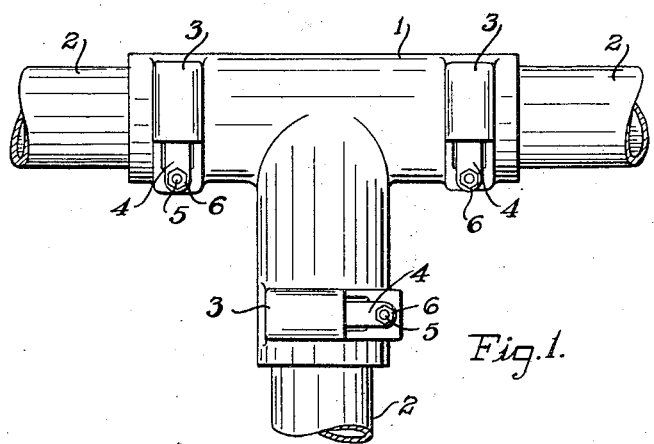
Fig. 1 is a side elevation of a coupling embodying my improvements.
Figure 2:
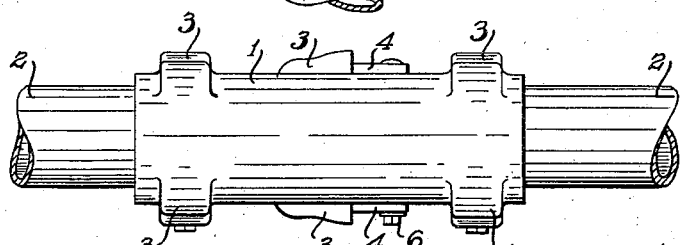
Fig. 2 is a top plan of same.
Figure 3:
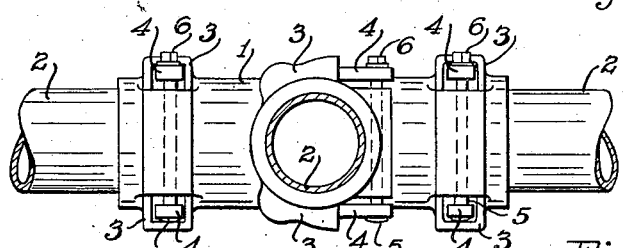
Fig. 3 is a bottom plan.
Figure 5:
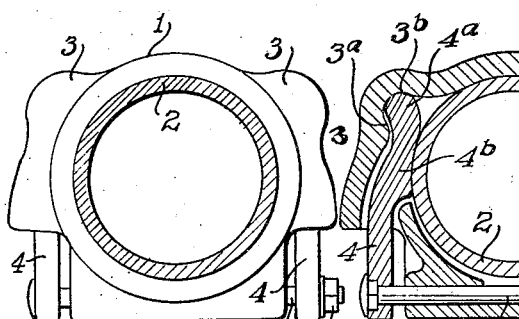
Fig. 5 is an end view.
Figure 4:
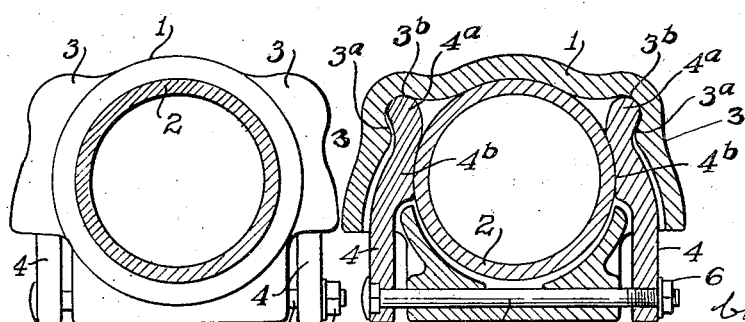
Fig. 4 is a section of Fig. 1 taken through the housing 3.

Referring to the drawings, 1 represents a cast fitting, which in the present case is of T-shape, each section of which has interior chamber shaped to receive therein the tubular members 2 to be connected together. This fitting, however, may have its chambers square in cross section or any other desired shape to conform to the contour of the members to be connected. Cast on the exterior of each side of each section of the fitting is a housing 3 and within the housing the wall of the fitting is cut away so that the interiors of the fitting and the housing communicate. As shown in Fig. 4, each housing is formed with a constricted portion near its upper end by casting the wall of the housing with an enlargement as indicated at $3^a$ and the housing immediately above this enlargement $3^a$ has the interior wall thereof formed of a rounding character to form a concave seat as indicated at $3^b$. Each pair of housings receives a pair of dogs 4, the inner end of each dog being provided with a rounded angularly-arranged nose $4^a$ which fits the seat $3^b$ of the housing. Each dog is also enlarged as indicated at $4^b$, the inner surface of the enlargement being concaved so as to conform to the cylindrical shape of the member 2. The outer ends of each pair of dogs are connected by a bolt 5 which extends through perforations in the dogs and also through a transverse opening in the wall of the fitting 1.

In operation, the member to be connected is inserted in one of the sections of the fitting, the dogs are then inserted in the housing by turning them at a slight angle to the position occupied when in clamping relation with the member 2, the bolt is inserted through the perforations in the dogs and the fitting, a nut 6 screwed on the bolt and the free ends of the dogs thereby drawn together to firmly clamp the concave portions $4^b$ of the dogs against the member 2; the rounded noses $4^a$ of the dogs fulcruming on the seats $3^b$ in the housing. It will be noticed that the inner wall of each housing near the open end thereof is flared outwardly so as to permit of the insertion of the nose portion $4^a$ of the dog between the member 2 and the enlargement $3^a$ on the interior wall of the housing. After the dog has been inserted and placed in clamping position, it will be seen that it is retained in the housing by the peculiar formation of the interior wall of the housing and the nose of the dog.

Having thus described my invention, I claim:

1. In a coupling device, a fitting formed with a chamber to receive a member to be clamped, the walls of said chamber being provided with a pair of oppositely arranged apertures to expose said member therethrough, a pair of clamping members supported by said fitting having clamping portions lying coincident with said apertures, and adjustable means connecting said clamping members to cause them to approach each other in a direction transversely across said member to cause the clamping portions to be forced against the wall of the member located in said chamber.

2. In a coupling device, a fitting having a chamber to receive a member to be clamped, the walls of said chamber being provided with a pair of oppositely arranged apertures, a pair of dogs carried by said fitting having clamping portions lying coincident with said apertures, one of the ends of each of said dogs being fulcrumed on said fitting, and means for adjustably connecting the opposite ends of said dogs together to draw the clamping portions thereof towards each other in a direction transversely across the chamber and against the member in said chamber.

3. In a coupling device, a fitting having a chamber to receive a member to be clamped, said chamber being provided with a pair of opposite apertures, a pair of dogs carried by said fitting, each dog having one end fulcrumed on said fitting and having a clamping portion lying coincident with one of the apertures of said fitting, the free ends of said dogs having aligned apertures, and a bolt extending through said aligned apertures having a nut to force the clamping portions of said dogs against the member to be clamped.

4. In a coupling device, a fitting having a chambered portion to receive a member to be clamped, oppositely arranged housings formed on said chambered portion, said chambered portion having apertures communicating with said housings, a dog fulcrumed in each housing and projecting therefrom and having a clamping portion lying coincident with the corresponding aperture, and means connecting the projecting portions of said dog for drawing the clamping portions thereof against the member to be clamped.

5. In a coupling device, a fitting having a chambered portion to receive a member to be clamped, oppositely arranged housings formed on said chambered portion, said chambered portion having apertures communicating with said housings, a dog fulcrumed in each housing and projecting therefrom and having a clamping portion lying coincident with the corresponding aperture, the projecting portions of said dogs and said fitting having aligned apertures, and a bolt extending through said aligned apertures and having a nut.

6. In a coupling device, a fitting having a chambered portion to receive a member to be clamped, said chambered portion having a pair of opposite housings open at one end and also having apertures communicating with said housings, each of said housings having a restricted portion and a seat on the inner side of said restricted portion, a dog in each housing having an angularly arranged nose fitted to the seat therein and projecting from the open end of said housing, said dog also having a clamping portion lying coincident with the corresponding aperture in said chambered portion, and means for adjustably connecting the projecting ends of said dogs together.

7. In a coupling device, a fitting having a chambered portion to receive a member to be clamped, said chambered portion having a pair of opposite housings each open at one end and also having apertures communicating with said housings, each of said housings having a restricted portion and a seat on the inner side of said restricted portion, a dog in each housing having an angularly arranged nose fitted to the seat therein and projecting from the open end of said housing, said dog also having a clamping portion lying coincident with the corresponding aperture in said chambered portion, the projecting ends of said dogs and the wall of said chambered portion having aligned apertures, and a bolt extending through said aligned apertures and having a nut.

In testimony whereof, I have hereunto set my hand this 12th day of April, 1926.

CHARLES E. HOPPES.